(12) United States Patent
Cutler et al.

(10) Patent No.: US 9,609,066 B2
(45) Date of Patent: Mar. 28, 2017

(54) ENHANCED DISCOVERY FOR AD-HOC MEETINGS

(71) Applicant: Microsoft Corporation, Redmond, WA (US)

(72) Inventors: Ross Garrett Cutler, Redmond, WA (US); Andrew Peter Sinclair, Redmond, WA (US); Jonathan Adam Kauffman, Seattle, WA (US); Anton Krantz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 14/529,680

(22) Filed: Oct. 31, 2014

(65) Prior Publication Data
US 2015/0350267 A1    Dec. 3, 2015

Related U.S. Application Data

(60) Provisional application No. 62/006,711, filed on Jun. 2, 2014.

(51) Int. Cl.
| | |
|---|---|
| G06F 15/16 | (2006.01) |
| H04L 29/08 | (2006.01) |
| H04L 29/06 | (2006.01) |
| H04W 72/04 | (2009.01) |
| H04W 4/00 | (2009.01) |
| H04B 5/00 | (2006.01) |
| G06Q 10/10 | (2012.01) |

(52) U.S. Cl.
CPC ........... *H04L 67/141* (2013.01); *G06Q 10/10* (2013.01); *H04B 5/0031* (2013.01); *H04L 29/06* (2013.01); *H04L 65/403* (2013.01); *H04L 69/16* (2013.01); *H04L 69/161* (2013.01); *H04W 4/008* (2013.01); *H04W 72/04* (2013.01)

(58) Field of Classification Search
CPC ...................................................... H04L 67/148
USPC .................................................. 709/228, 229
See application file for complete search history.

(56) References Cited

U.S. PATENT DOCUMENTS

| | | |
|---|---|---|
| 6,934,370 B1 | 8/2005 | Leban et al. |
| 7,443,807 B2 | 10/2008 | Cutler |
| 7,525,928 B2 | 4/2009 | Cutler |
| 8,189,807 B2 | 5/2012 | Cutler |
| 8,245,043 B2 | 8/2012 | Cutler |
| 8,368,540 B2 | 2/2013 | Perkins et al. |

(Continued)

OTHER PUBLICATIONS

Castro, et al., "A Probabilistic Room Location Service for Wireless Networked Environments", In Proceedings of the 3rd international conference on Ubiquitous Computing, Sep. 30, 2001, 19 pages.

(Continued)

*Primary Examiner* — Hieu Hoang

(57) ABSTRACT

Systems, methods, and software are disclosed herein for enhancing ad-hoc online meetings. In an implementation, a service client receives an initial handoff of an online session from an initial service client that was ongoing between the initial service client and at least one other service client. The service client detects when proximate to an in-room service client. When proximate to the in-room service client, the service client initiate a subsequent handoff of the online session to the in-room service client.

11 Claims, 7 Drawing Sheets

(56) References Cited

U.S. PATENT DOCUMENTS

| | | | |
|---|---|---|---|
| 8,614,734 | B2 | 12/2013 | Cutler |
| 2002/0101918 | A1 | 8/2002 | Rodman et al. |
| 2006/0046709 | A1 | 3/2006 | Krumm et al. |
| 2007/0234048 | A1 | 10/2007 | Ziv |
| 2011/0009075 | A1* | 1/2011 | Jantunen ............... G06K 7/0008 455/73 |
| 2011/0179182 | A1 | 7/2011 | Vadla |
| 2013/0064142 | A1 | 3/2013 | Bhow |
| 2013/0106977 | A1 | 5/2013 | Chu et al. |
| 2013/0166742 | A1 | 6/2013 | Wiener et al. |
| 2013/0231130 | A1* | 9/2013 | Cherian ................ H04W 4/025 455/456.1 |
| 2013/0315235 | A1* | 11/2013 | Foo ......................... H04L 67/06 370/389 |
| 2013/0318249 | A1 | 11/2013 | McDonough et al. |
| 2013/0339478 | A1* | 12/2013 | Edge ....................... H04L 67/16 709/217 |
| 2013/0342637 | A1 | 12/2013 | Felkai et al. |
| 2014/0223334 | A1* | 8/2014 | Jensen ................ G06Q 10/101 715/753 |
| 2014/0359709 | A1* | 12/2014 | Nassar ............... H04L 65/1083 726/4 |

OTHER PUBLICATIONS

Koo, et al., "Autonomous Construction of a WiFi Access Point Map Using Multidimensional Scaling", In Proceedings of the 9th international conference on Pervasive computing, Jun. 12, 2011, 18 pages.

Azizyan, et al., "SurroundSense: Mobile Phone Localization via Ambience Fingerprinting", In Proceedings of the 15th annual international conference on Mobile computing and networking, Sep. 20, 2009, 12 pages.

Satoh, et al., "Poster Abstract: Ambient Sound-based Proximity Detection with Smartphones", In Proceedings of the 11th ACM Conference on Embedded Networked Sensor Systems, Nov. 11, 2013, 2 pages.

Hsu, et al., "HBCI: Human-Building-Computer Interaction", In Proceedings of the 2nd ACM Workshop on Embedded Sensing Systems for Energy-Efficiency in Building, Nov. 2, 2010, 6 pages.

Jacob, Josh., "QR Directory App—Overview", In Blog of Josh Jacob Dev, Apr. 21, 2011.

Rouillard, José., "Contextual QR Codes", In Proceedings of the Third International Multi-Conference on Computing in the Global Information Technology, Jul. 27, 2008, 6 pages.

"Second Written Opinion Issued in PCT Application No. PCT/US2015/033633", Mailed Date: Apr. 28, 2016, 7 Pages.

"International Search Report & Written Opinion Received for PCT Patent Application No. PCT/US2015/033633", Mailed Date: Sep. 18, 2015, 11 Pages.

"International Search Report & Written Opinion Issued in PCT Application No. PCT/US2015/033545", Mailed Date: Aug. 20, 2015, 11 Pages.

"International Preliminary Report on Patentability Issued in PCT Application No. PCT/US2015/033633", Mailed Date: Aug. 31, 2016, 8 Pages.

* cited by examiner

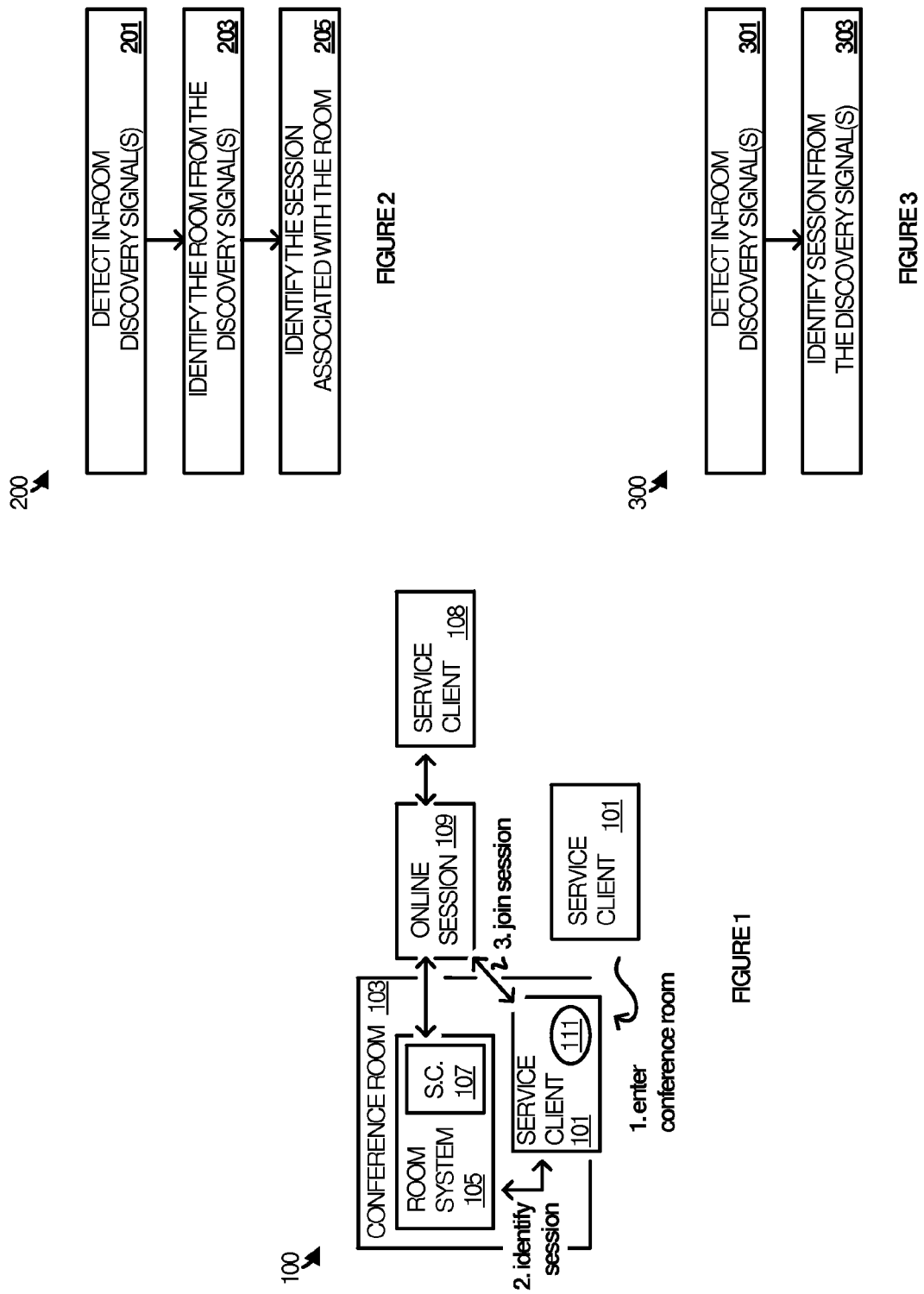

ENHANCED DISCOVERY FOR AD-HOC MEETINGS

RELATED APPLICATIONS

This applications is related to and claims priority to U.S. Provisional Patent Application No. 62/006,711, filed on Jun. 2, 2014, and entitled "Enhanced Discovery for Ad-Hoc Meetings," which is hereby incorporated by reference in its entirety.

TECHNICAL BACKGROUND

A great deal of software technology exists that allows users to participate in video conference sessions and other types of multi-user communication exchanges. Microsoft® Lync®, Skype®, Google® Hangouts, and IBM® Sametime are only a few examples of technology offerings in the marketplace today.

Users typically participate in such sessions through an application client running on their own device. A familiar scenario might involve users engaging in a video conference with each other from their desks or individual work space via a client running on their desktop computer, laptop computer, tablet, or mobile phone.

However, another familiar scenario might involve users gathering in a meeting space, such as a conference room or huddle, from where they connect to other users remote from the meeting space. In these situations, a lead participant may plug-in his or her device to multi-media equipment in the space, such as a video capture device and a display, so that the local scene may be captured for those participating remotely. Should others in the room also want to join-in online, they would need to join the online meeting by clicking on a uniform resource locator (URL) associated with the lead participant, for example.

Advanced meeting technology has been developed to allow users to hold ad-hoc online meetings from a meeting space without having to bring their own device to the space. The Lync® Room System (LRS) from Microsoft® is just one example of such a meeting system that serves as its own node in an online meeting. Users can simply enter a room where the LRS is available and installed and begin meeting with other participants.

While such systems reduce the need for users to bring their own device to a meeting, some may also want to participate in the session using their own device. For instance, a user may want to download content that is being presented, share their own content, or chat with others who are engaged in the meeting.

In order for a user to join an ongoing meeting in an ad-hoc fashion, the user has to have knowledge of the identity of the room in which the meeting is occurring, or more likely, the identity of the meeting system associated with the room. The identity of the space or the room would then be used by the user's client to call into or otherwise join the meeting. Once joined to the meeting, the user would be able to participate through his or her client to consumer and share content, for example, while still also participating in the session through the meeting system in the room.

OVERVIEW

Provided herein are systems, methods, and software to enhance meeting technology in support of ad-hoc meetings.

In various implementations, a user may be engaged in an online session via an initial service client. The online session may be handed off to a service client associated with the user. The user may move to a new location, such as a conference room, at which time the online session may be handed-off again from the service client to an in-room service client. In this manner, the user can move with ease from one meeting space to another, while remaining engaged in the online session throughout the process.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an operational scenario in an implementation where a user joins an online session in an ad-hoc fashion.

FIG. 2 illustrates a flow diagram in an implementation representative of a process that may be employed to join users to ad-hoc meetings.

FIG. 3 illustrates a flow diagram in an implementation representative of a process that may be employed to join users to ad-hoc meetings.

TECHNICAL DISCLOSURE

Figure 4:
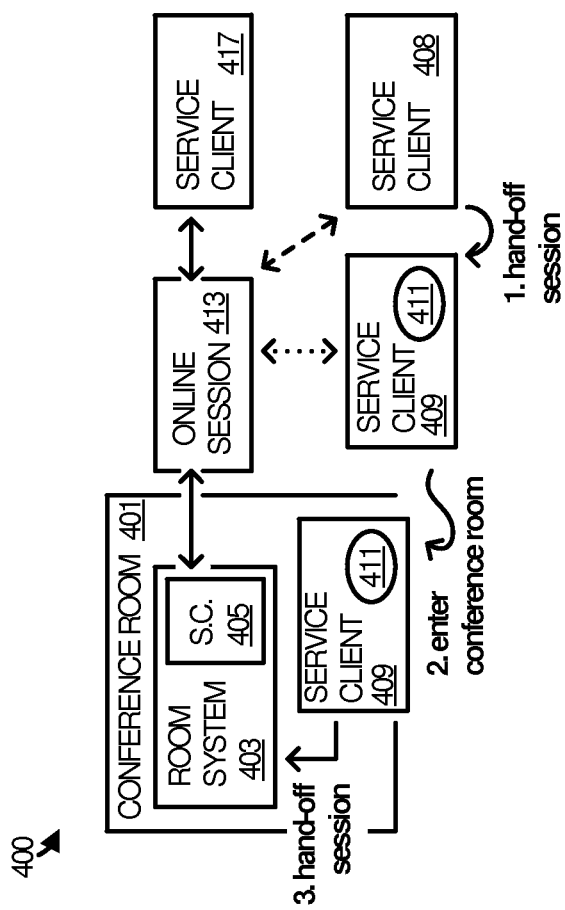
FIG. 4 illustrates an operational scenario in an implementation whereby a user hands-off a session from one device to another and to an in-room system.

Device and session discovery is an important part of joining a meeting for Lync® or Skype®, as well as any other communication service. Today, device discovery is done manually by plugging in a conferencing device into your laptop for example. However discovery can be done automatically using a variety of techniques which would allow a user to join a meeting using a variety of devices in the conference room (e.g., RoundTable, interactive whiteboard, Lync Room System, etc.), and would allow the devices in the room to automatically know about each other. Implementations disclosed herein enable enhanced device discovery and session discovery for ad-hoc meetings.

In an example, audible or inaudible sounds may be used to transmit a device ID or IP address. A receiving device can use the device identifier (ID), Internet protocol (IP) address, uniform resource locator (URL), or other similar information to join an ongoing session in the room, or possibly to initiate a new session, share content, or consume content. Other technology could be used to distribute such information in a room, such as infrared LEDs, quick response (QR) codes, or the like. Even ambient room lighting can be used to encode a URL or room ID which can be detected by a device's camera, such as a smartphone's camera. Alternatively the ambient lighting can be used to perform room proximity validation in combination with other aforementioned techniques.

In some scenarios a Bluetooth or Wi-Fi transmitter/access point may be used to broadcast the room ID as part of the device name/SSID. A receiving device may use the strongest signal seen and then validate the room proximity using an audible or inaudible signal that is provided by a different device, such as a room speaker(s). In other scenarios, instead of using a proximity validation sound, the ambient room noise can be used for proximity detection. If there is sufficient HVAC noise, talking, or other background noise, then this sound can be captured by the participant's device (e.g. smartphone) and room system, and compared to see if they are a match (and in the same room).

In some cases, the Wi-Fi signals in a building (not necessarily specific to a room) can be used to determine the approximate room location. A conference room system can then create audible or inaudible audio to perform room proximity validation. Thus, a room need not have a wireless transmitter itself. The audible or inaudible sound can be played from a small speaker built into satellite microphones or separate small speakers placed on a conference room table. By placing several small speakers closer to a participant, the inaudible sound can have a lower volume but higher signal-to-noise ratio (SNR) for that user's device. Near field communications (NFC) may also be used between two devices to validate the proximity of one to the room. NFC may also be used to share content or hand off sessions.

Some implementations may use a structured signal in a room's display to encode the room ID, meeting URL, or document ULR that is being displayed. A QR-like code can be encoded using alternating +1 and −1 signals that when presented at 120 Hz are not visible to humans but that can be detected by a camera. Another method is to encode the URL by using a quadrature-like signal where the display intensity is changed by +1 to −1 at the corners using a bilinear multiplier mask.

Referring now to the drawings, FIG. 1 illustrates an operational scenario 100 in an implementation. Operational scenario 100 involves service client 101, room system 105 in conference room 103, service client 107, and service client 108. In this example scenario, service client 107 is engaged in an online session 109 with service client 108. Other service clients may also be engaged in the session, although just two clients are illustrated for purposes of clarity.

Figure 9:
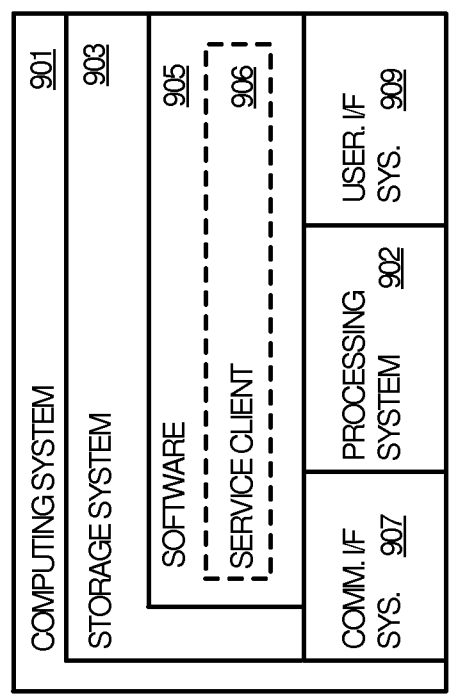
FIG. 9 illustrates a computing system suitable for implementing any of the applications, architectures, services, processes, and operational scenarios disclosed herein with respect to FIGS. 1-8 and discussed below in the Technical Disclosure.

Service client 101 may be implemented on a mobile device, such as a laptop, tablet, or notebook computer, as well as a mobile phone, wearable device, or some other suitable computing system, of which computing system 901 in FIG. 9 is representative.

As such, a user may carry or otherwise physically transport the mobile device from one location into or nearby conference room 103. Accordingly, service client 101 may be considered to have moved and entered conference room 103. Upon entering conference room 103, service client 101 identifies the session that is ongoing with respect to room system 105, by way of service client 107. Service client 101 employs process 111 in order to identify the session. FIG. 2 and FIG. 3 each illustrate a flow diagram representative of the functionality that may be driven by process 111.

After identifying the session, service client 101 is able to dynamically join the session, allowing the user to participate and communicate with others on the session. For example, another person or people may be present in conference room 103 and may be speaking with or otherwise communicating with another person or people engaged in the session by way of service client 108.

As mentioned, FIG. 2 includes a flow diagram 200 that illustrates steps representative of the functionality provided by process 111 in some implementations when employed to identify a session. Process 111 may be embodied in program instructions executed by a computing system suitable for implementing in a service client, such as service client 101. Process 111 may be integrated in service client 101, although in some implementations process 111 may be separate from service client 101 or distributed across multiple programs, application modules, or software layers.

To begin, process 111 functions to detect an in-room discovery signal (step 201) that identifies a room. Examples of an in-room signal include, but are not limited to, Wireless Fidelity (Wi-Fi) signals, modulated light signals, sound (audible or sub-audible), ambient noise signals, or any other type of in-room signal capable of identifying the room.

Process 111 examines the signal to identify the room with which the signal is associated (step 203). In many cases the signal may originate from within the room. For instance, a speaker may output an audible noise that identifies the room, a light in the room may oscillate in such as manner as to encode the identity of the room in the light, or the SSID of a Wi-Fi signal may include information that identifies the room.

Upon identifying the room, process 111 identifies a session associated with the room (step 205), thus allowing service client 101 to join the session. This may be accomplished by, for example, querying an online service with the room identity in order to discover a session or sessions associated with the room. The online service may reply with a session identifier with which service client 101 can join the session. In other implementations, the online service may be queried with the room identity for the identity of a service client associated with the room. The online service could return a handle or other such identifier with which service client 101 could initiate a session. Thus, an ongoing session could be joined or a new session could be initiated.

FIG. 3 illustrates another flow diagram 300 that describes functionality that could be applied in an alternative scenario. To begin, process 111 detects an in-room discovery signal (step 301) that identifies a session associated with a room. Examples of such an in-room signal include, but are not limited to, Wireless Fidelity (Wi-Fi) signals, modulated light signals, sound (audible or sub-audible), ambient noise signals, or any other type of in-room signal capable of identifying the room. The in-room signal could have an identifier for a session encoded therein.

Accordingly, process 111 examines the signal to identify the session (step 303). Having discovered an identifier for session, service client 101 is able to join the session. This may be accomplished by, for example, sending a request to an online service to join the session. Alternatively, this may be accomplished by sending an invite to a service client, such as service client 108, to initiate a new session.

FIG. 4 illustrates operational scenario 400 in an implementation. Operational scenario 400 involves conference room 401, and more particularly, a room system 403 in conference room 401. Room system 403 includes service client 405. Operational scenario 400 also involves service client 408, service client 409, and service client 417.

Service clients 405, 408, 409, and 417 may each be implemented on a suitable computing system, such as a desktop, laptop, tablet, or notebook computer, a mobile phone, wearable device, smart appliance, or some other suitable computing system, of which computing system 901 in FIG. 9 is representative.

In operation, service client 408 is engaged with service client 417 via online session 413. A user operating service client 417 may desire to move the session to a different location. To do so, online session 413 is handed off to service client 409, at which point online session 413 is transferred to service client 409. At this point, online session 413 is established between service client 417 and service client 409. The user may move service client 409 to conference room 401, at which point online session 413 can be handed off to service client 405, via room system 403.

Figure 5:
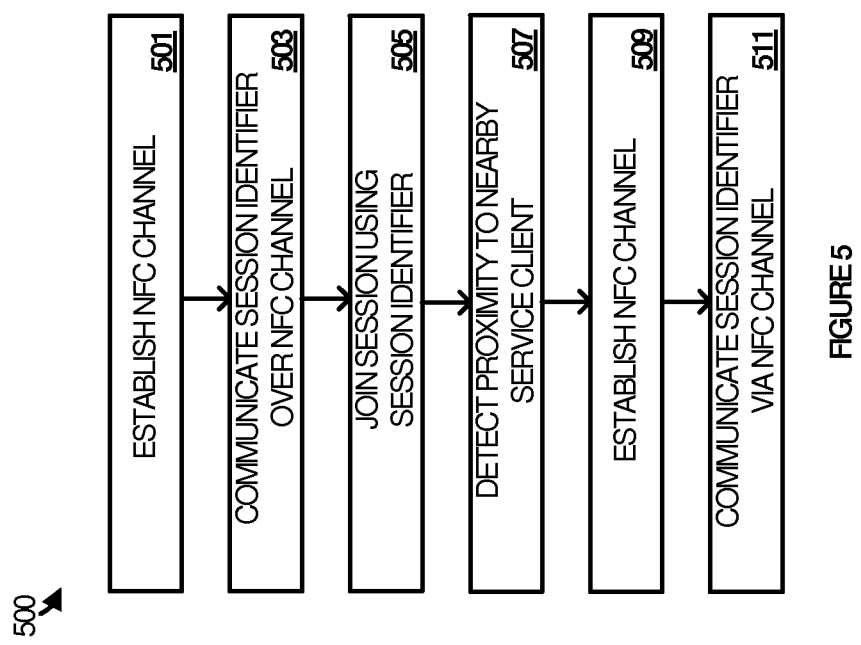
FIG. 5 illustrates a flow diagram in an implementation representative of a process that may be employed to hand-off sessions.

Service client 409 employs process 411 to assist with both taking the hand-off of online session 413 from service client 408 and making the hand-off to service client 405. FIG. 5 includes a flow diagram 500 that illustrates steps representative of the functionality provided by process 411 in some implementations when employed to carry a session from one service client to another as describe above. Process 411 may be embodied in program instructions executed by a computing suitable for implementing in a service client, such as service client 409. Process 411 may be integrated in service client 409, although in some implementations process 411 may be separate from service client 409 or distributed across multiple programs, application modules, or software layers.

In operation, process 411 functions to establish a near-field communications (NFC) channel with service client 408, or the device on which service client 408 is implemented (step 501). A session identifier for online session is exchanged over the NFC channel between service client 408 and service client 409 (step 503). Service client 409 may respond to the receipt of the service identifier over the NFC channel by communicating with the online service hosting online session 413, or directly with service client 417, so that online session 413 can be moved from service client 408 to service client 409. It is possible that in some scenarios service client 408 may remain engaged on the session, at least for a limited period of time until the session is handed-off fully to service client 409. Regardless, service client 409 joins the session (step 505).

A user engaged with service client 409 may decide to move to a different location, such as conference room 401. The user may also desire to hand-off online session 413 from service client 409 to a service client in conference room 401. To do so, the user enters conference room 401 with the device in-hand on which service client 409 is employed. Upon entering the room, the user may position the device in close enough proximity to room system 403 that process 411 detects that it is proximate to another system associated with another service client (step 507). In response, process 411 establishes another NFC channel with that system, which in this example is room system 403 (step 509).

Once the NFC channel is established, process 411 may communicate the session identifier for online session 413 to service client 405 (step 511). Service client 405 can use the session identifier to join the session, such as by sending a request to an online service that identifies the session. The session will thus be "handed off" from service client 409 from service client 408 via service client 409.

Figure 6:
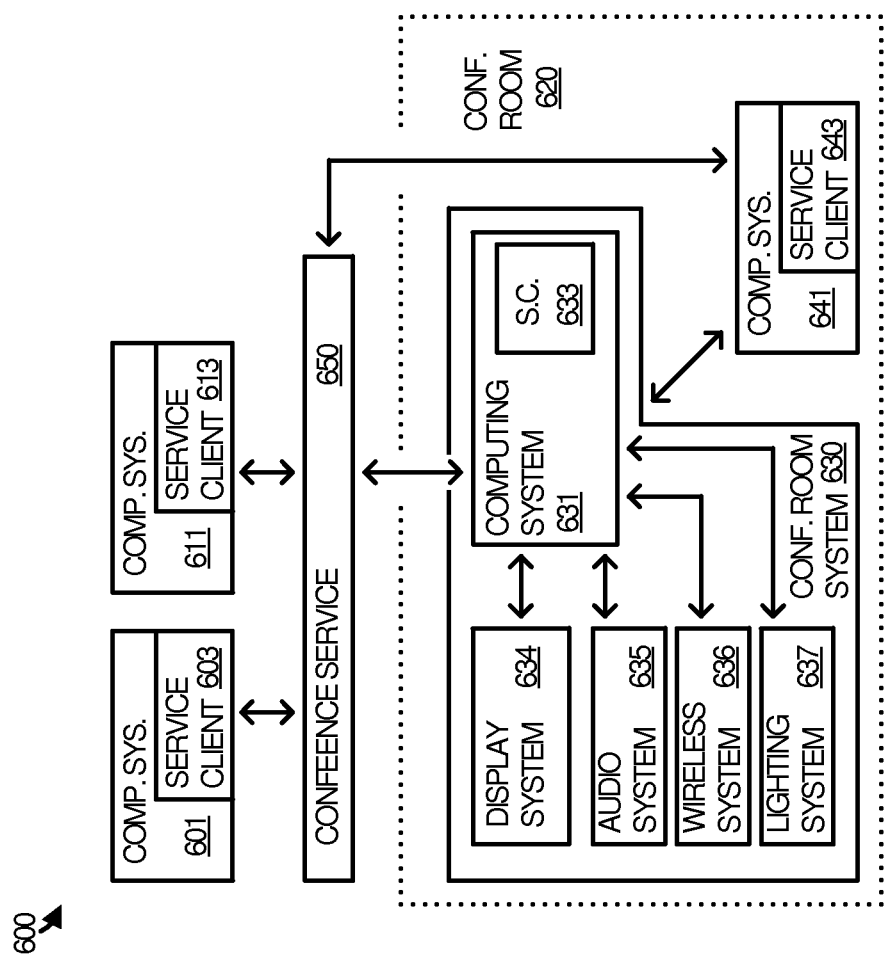
FIG. 6 illustrates a service architecture in an implementation.

FIG. 6 illustrates a service architecture in 600 in an implementation. Service architecture 600 includes computing system 601, computing system 631, conference room system 630, computing system 631, and conference service 650. Conference room system 630 includes computing system 631, display system 634, audio system 635, wireless system 636, and lighting system 637.

Each computing system in service architecture 600 includes a service client capable of communicating with conference service 650 to facilitate conference sessions, such as online voice, video, and data conferences, with other service clients. Microsoft® Lync®, Google® Hangouts®, and Apple® FaceTime® are examples of conference service 650, which may also be considered a unified communications service. Service client 603 runs on computing system 601, service client 613 runs on computing system 631, service client 633 runs on computing system 631, and service client 643 runs on computing system 631.

Figure 7:
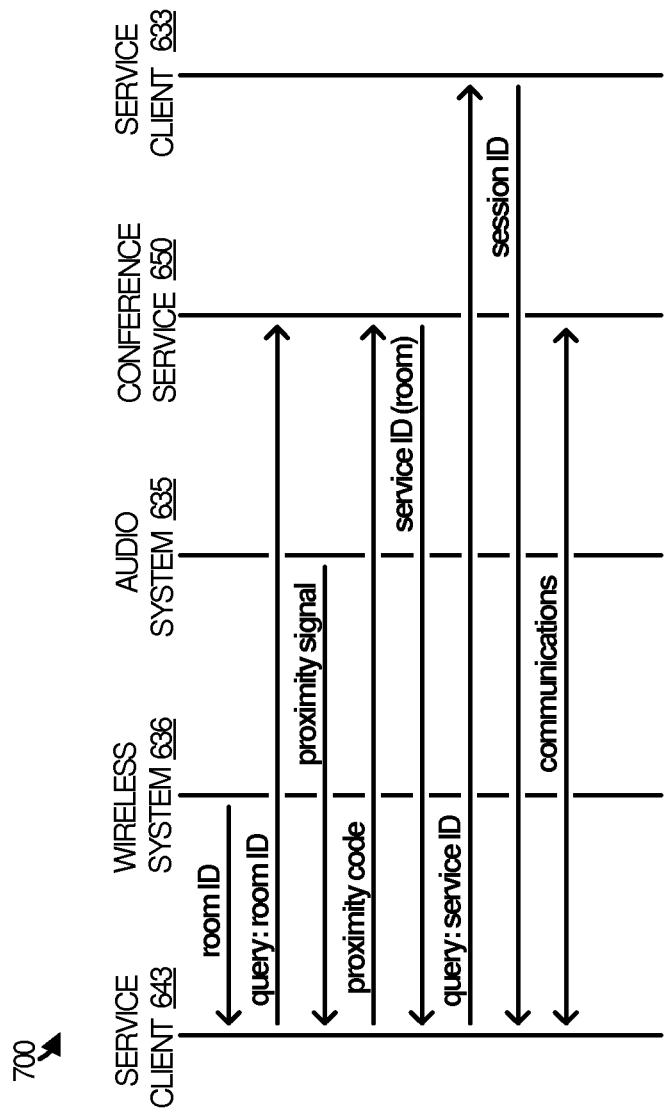
FIG. 7 illustrates an operational scenario in an implementation.

FIG. 7 illustrates an operational scenario 700 that may occur in the context of service architecture 600. In operation, wireless system 636 broadcasts a room identifier (ID) that can be received in conference room 620, and possibly beyond it. The room ID may be included in, for example, the service set identifier (SSID) associated with a Wi-Fi (802.11) network. While wireless system 636 provides the room ID in this example, the room ID could be provided by audio system 635 by way of a sound-based signal, by lighting system 637 by way of a light-based signal, by display system 634 in a quick response (QR) code, or by some other system having capabilities suitable for communicating a room ID.

Upon entering conference room 620, service client 643 discovers the room ID from one of the aforementioned sources and queries conference service 650 to identify a service ID for conference room 620. Subsequent to the query, or possibly at substantially the same time as the query, audio system 635 transmits a proximity signal that can be detected by service client 643 or some other component on computing system 631. The proximity signal may be an audible or sub-audible sound detectable by computing system 631.

Service client 643 provides the proximity signal or a proximity code carried within it to conference service 650. Conference service 650 compares the proximity signal or code to a reference signal or code to determine if service client 643 is actually located in conference room 620. Assuming this is the case, conference service 650 replies to the query with a service ID suitable for joining a session ongoing in conference room 620.

The service ID may correspond to service client 633, enabling service client 643 to communicate with service client 633 using the service ID. To join an ongoing session in conference room 620, service client 643 may query service client 633 using the service ID. In reply, service client 633 may provide a session ID for an ongoing session. Service client 643 can then join the ongoing session using the session ID. In this example, service client 643 is depicted as exchanging session communications with conference service 650, although service client 643 may communicate directly with session participants.

Figure 8:
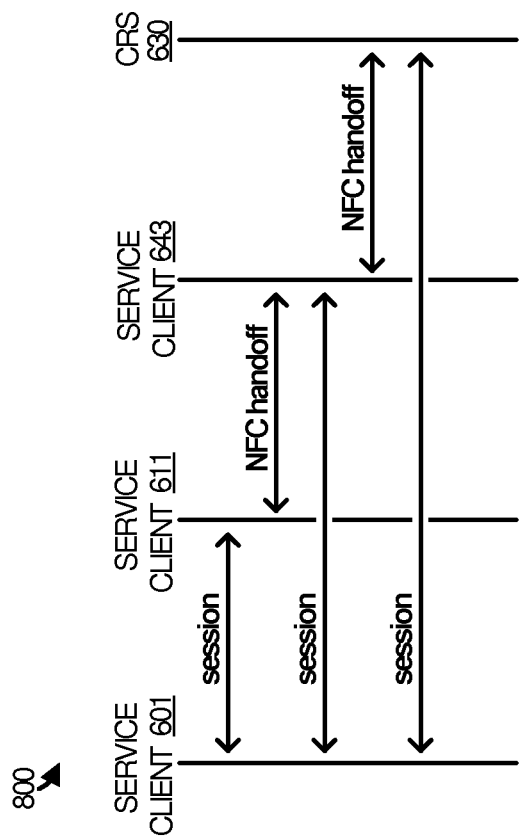
FIG. 8 illustrates an operational scenario in an implementation.

FIG. 8 illustrates another operational scenario 800 that may occur in the context of service architecture 600. In operation, service client 601 is initially engaged in a session with service client 611. Service client 643 established an NFC connection with service client 611, which prompts a handoff of the session from service client 611 to service client 643. Accordingly, session communications may be exchanged between service client 601 and service client 643.

Service client 643 may be physically moved such that it becomes proximate to conference room system 630. Service client 643 establishes an NFC connection with an element in conference room system 630, such as display system 634 or possibly computing system 631. Upon doing so, the session is handed off to conference room system 630 in general, and one or more of its elements in particular.

Various improvements to meeting technology may be appreciated from the foregoing implementations. The ability to join an online session in an ad-hoc manner allows users to enter rooms and easily participate with others engaged in a meeting in the room without having to be specifically invited to have possession of a specific identifier for the meeting. Rather, users can merely walk into a room with their device and their device can be joined to an ongoing meeting with a great deal of ease and efficiency.

Such technical effects improve the functioning of online meetings and enhance the user experience. For instance, when a room system is deployed in a meeting space, participants in the room can engage with remote participants through the room system. Any of the participants in the room, or a new participant who enters the room, can join the online meeting with their own device just by virtue of being in the room. This substantially reduces the barriers to hosting online meetings and increases the likelihood that people will use such conferencing technology.

In addition, in some implementations users are able to handoff their sessions from one device to another, increasing user mobility and the ability for users to move from one meeting space to another. For example, a user may begin an online session at their desktop computer, hand it off to their phone, walk with their phone to a conference room, and then seamlessly handoff the session to a system in the conference room.

FIG. 9 illustrates computing system 901 that is representative of any system or collection of systems in which the various operational architectures, scenarios, and processes disclosed herein may be implemented. Examples of computing system 901 includes, but is not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes at service client 906, which is representative of the service clients discussed with respect to the preceding FIGS. 1-8, and which may be used to implement process 111, process 411, and the other processes discussed with respect to the foregoing implementations. When executed by processing system 902 to enhance device and session discovery, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced device and session discovery and related functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include update process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced device and session discovery. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIGS. 1-8 as an example, through the operation of a computing system or systems of which computing system 901 is representative, transformations may be performed with respect to the various sessions described therein. As an example, a service client may enter a room in a first state in which the service client is not engaged in a session. Upon discovering the session in the room, the service client may join the session, thereby changing its state. In another example, a session may be "handed off" from one client to another and moved from one location to another and changing its state.

It may be understood that computing system 901 is generally intended to represent a computing system or systems on which software 905 may be deployed and executed in order to implement enhanced device and session discovery. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

While FIGS. 1-8 generally depict relatively few users and relatively few instances of service clients, computing systems, and services, it may be appreciated that the concepts disclosed herein may be applied at scale. For example, the processes disclosed herein could be deployed in support of any number of online sessions, service clients, room systems, and conference services.

Certain inventive aspects may be appreciated from the foregoing disclosure, of which the following are various examples.

Example 1

An apparatus comprising: one or more computer readable storage media; and program instructions stored on the one or more computer readable storage media and comprising a service client for facilitating online meetings that, when executed by a processing system, direct the processing system to at least: receive an initial handoff of an online session from an initial service client that was ongoing between the initial service client and at least one other service client; detect when proximate to an in-room service client; and when proximate to the in-room service client, initiate a subsequent handoff of the online session to the in-room service client.

Example 2

The apparatus of Example 1 wherein, to receive the initial handoff, the service client directs the processing system to: establish an initial wireless communication channel with the initial service client; receive a session identifier over the initial wireless communication channel; and join the online session using the session identifier.

Example 3

The apparatus of Examples 1-2 wherein to join the online session using the identifier, the service client directs the processing system to communicate a request to join the online session to an online service that hosts the online session.

Example 4

The apparatus of Examples 1-3 wherein to initiate the subsequent handoff to the in-room service client, the service client directs the processing system to: establish a subsequent wireless communication channel with the subsequent service client; and communicate the session identifier to the subsequent service client over the subsequent wireless communication channel.

Example 5

The apparatus of Examples 1-4 wherein the initial wireless channel comprises a near-field communication channel and wherein the subsequent wireless channel comprises another near-field communication channel.

Example 6

The apparatus of Examples 1-5 wherein the service client further directs the processing system to at least detect an in-room discovery signal; identify a room from the in-room discovery signal; identify one other session based on the room associated with the in-room discovery signal; and join the one other session.

Example 7

The apparatus of Examples 1-6 further comprising the processing system configured to execute the service client, wherein the in-room discovery signal comprises an identity of the room encoded in the in-room discovery signal, and wherein to identify the room from the in-room discovery signal, the service client directs the processing system to decode the in-room discovery signal to obtain the identity of the room.

Example 8

The apparatus of Examples 1-7 wherein the service client further directs the processing system to detect a proximity signal that comprises a proximity code that is potentially associated with the room, where the service client directs the processing system to decode the proximity signal to obtain the proximity code.

Example 9

The apparatus of Examples 1-8 wherein to identify the session based on the room associated with the in-room discovery signal, the service client directs the processing system to: communicate the identity of the room and the proximity code to a conference service; receive in a reply from the conference service comprising a service identifier associated with one other in-room service client associated with the room; query the one other in-room service client using the service identifier; receive one other session identifier from the one other in-room service client; and join the one other session using the one other session identifier.

Example 10

The apparatus of Examples 1-9 wherein the in-room discovery signal comprises a wireless radio frequency signal and wherein the proximity signal comprises one of a modulated light signal, an audible sound, an inaudible sound, and ambient noise.

Example 11

The apparatus of Examples 1-10 wherein the in-room discovery signal comprises one of a modulated light signal, an audible sound, an inaudible sound, and ambient noise and wherein the proximity signal comprises one of another modulated light signal, another audible sound, another inaudible sound, and other ambient noise.

Example 12

A service architecture for facilitating ad-hoc online meetings comprising: a service client that receives an initial handoff of an online session from an initial service client that was ongoing between the initial service client and at least one other service client, detect when proximate to an in-room service client, and when proximate to the in-room service client, initiate a subsequent handoff of the online session to the in-room service client; and a conference service remote from the service client that hosts the online session before, during, and after the initial handoff and the subsequent handoff.

Example 13

The service architecture of Example 12 wherein to receive the initial handoff the service client establishes an initial wireless communication channel with the initial service client, receives a session identifier over the initial wireless communication channel, and joins the online session using the session identifier.

Example 14

The service architecture of Examples 12-13 wherein to join the online session using the identifier, the service client communicates a request to join the online session to the online service that hosts the online session.

Example 15

The service architecture of Examples 12-14 further comprising an in-room service client; wherein to initiate the subsequent handoff to the in-room service client, the service client establishes a subsequent wireless communication channel with the subsequent service client, and communicates the session identifier to the subsequent service client over the subsequent wireless communication channel.

Example 16

The service architecture of Examples 12-15 wherein the in-room service client joins the online session using the session identifier.

Example 17

The service architecture of Examples 12-16 wherein the initial wireless channel comprises a near-field communication channel and wherein the subsequent wireless channel comprises another near-field communication channel.

Example 18

A method for facilitating ad-hoc online meetings comprising: in a service client, receiving an initial handoff of an online session from an initial service client that was ongoing between the initial service client and at least one other service client; upon entering a room with an in-room service client installed on a conference room system, the service client detecting when proximate to the in-room service client; when proximate to the in-room service client, the service client initiating a subsequent handoff of the online session to the in-room service client; and in a conference service remote from the service client, hosting the online session before, during, and after the initial handoff and the subsequent handoff.

Example 19

The method of Example 18 wherein receiving the initial handoff comprises the service client establishing an initial wireless communication channel with the initial service client, receiving a session identifier over the initial wireless communication channel, and joining the online session using the session identifier.

Example 20

The method of Examples 18-19 wherein the initial wireless channel comprises a near-field communication channel and wherein the subsequent wireless channel comprises another near-field communication channel.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
one or more computer readable storage media; and
program instructions stored on the one or more computer readable storage media and comprising a service client for facilitating online meetings that, when executed by a processing system, direct the processing system to at least:
detect an in-room discovery signal that comprises a wireless radio frequency signal;
identify a room associated with a room identifier from the in-room discovery signal;
detect a proximity signal that comprises a proximity code associated with the room, wherein the proximity signal comprises one of a modulated light signal, an audible sound, an inaudible sound, and ambient noise associated with the room;
communicate the room identifier and the proximity code to a conference service, and receive in a reply a service identifier associated with an in-room service client;
query the in-room service client using the service identifier;
receive a session identifier from the in-room service client; and
join an online session using the session identifier.

2. The apparatus of claim 1 wherein the service client further directs the processing system to at least identify one other session based on the room associated with the in-room discovery signal; and join the one other session.

3. The apparatus of claim 2 further comprising the processing system configured to execute the service client, wherein the in-room discovery signal comprises the identity of the room encoded in the in-room discovery signal, and wherein to identify the room from the in-room discovery signal, the service client directs the processing system to decode the in-room discovery signal to obtain the identity of the room.

4. The apparatus of claim 3 wherein the service client directs the processing system to decode the proximity signal to obtain the proximity code.

5. The apparatus of claim 4 wherein
the online session comprises a video conference.

6. A system for facilitating ad-hoc online meetings comprising:
a service client, comprising a first processor, that at least:
detects an in-room discovery signal which comprises a wireless radio frequency signal;
identifies a room associated with a room identifier from the in-room discovery signal;
detects a proximity signal that comprises a proximity code associated with the room, wherein the proximity signal comprises one of a modulated light signal, an audible sound, an inaudible sound, and ambient noise associated with the room;
communicates the room identifier and the proximity code to a conference service, and receives in a reply a service identifier associated with an in-room service client;

queries the in-room service client using the service identifier;

receives a session identifier from the in-room service client; and joins an online session using the session identifier; and the conference service, comprising a second processor and remote from the service client, the conference service hosts the online session, identifies the session identifier based on the room identifier and communicates the reply to the service client.

7. The system of claim 6 further comprising the in-room service client.

8. The system of claim 7 wherein the service client identifies one other session based on the room associated with the in-room discovery signal and joins the one other session.

9. The system of claim 8 wherein the in-room discovery signal comprises the room identifier encoded in the in-room discovery signal and wherein to identify the room from the in-room discovery signal the service client decodes the in-room discovery signal to obtain the identity of the room.

10. A method of operating a service client for facilitating ad-hoc online meetings hosted by a conference service, the method comprising:

detecting an in-room discovery signal which comprises a wireless radio frequency signal;

identifying a room associated with a room identifier from the in-room discovery signal;

detecting a proximity signal that comprises a proximity code associated with the room, wherein the proximity signal comprises one of a modulated light signal, an audible sound, an inaudible sound, and ambient noise associated with the room;

communicating the room identifier and the proximity code to the conference service, and receiving in a reply a service identifier associated with an in-room service client;

querying the in-room service client using the service identifier;

receiving a session identifier from the in-room service client; and joining an online session using the session identifier.

11. The method of claim 10 wherein the in-room discovery signal comprises the identity of the room encoded in the in-room discovery signal, and wherein identifying the room from the in-room discovery signal comprises decoding the in-room discovery signal to obtain the identity of the room.

* * * * *